(12) United States Patent
Xiong et al.

(10) Patent No.: US 12,532,818 B1
(45) Date of Patent: Jan. 27, 2026

(54) PLANTING DEVICE

(71) Applicant: Vego Innovations, Inc., Tomball, TX (US)

(72) Inventors: Guang-Yuan Xiong, Tomball, TX (US); Zhu-Lin Liu, Shenzhen (CN); Hong-Jie Yan, Shenzhen (CN)

(73) Assignee: Vego Innovations, Inc.

( * ) Notice: Subject to any disclaimer, the term of this patent is extended or adjusted under 35 U.S.C. 154(b) by 0 days.

(21) Appl. No.: 18/963,639

(22) Filed: Nov. 28, 2024

(30) Foreign Application Priority Data

Nov. 12, 2024 (CN) .......................... 202422755977.6

(51) Int. Cl.
*A01G 9/28* (2018.01)

(52) U.S. Cl.
CPC ...................................... *A01G 9/28* (2018.02)

(58) Field of Classification Search
CPC ....................................................... A01G 9/28
See application file for complete search history.

(56) References Cited

U.S. PATENT DOCUMENTS

| | | | | |
|---|---|---|---|---|
| 826,689 | A * | 7/1906 | Roth | A01G 9/28 52/102 |
| 2,094,519 | A * | 9/1937 | Ballard | A01G 9/28 47/33 |
| 5,020,272 | A * | 6/1991 | Herrema | A01G 9/28 47/33 |
| 5,157,867 | A * | 10/1992 | Fritch | A01G 9/28 47/33 |
| 9,546,017 | B2 * | 1/2017 | Li | B65D 11/20 |
| 10,568,276 | B1 * | 2/2020 | Fakhari | A01G 9/28 |
| D948,972 | S * | 4/2022 | Wang | D8/1 |
| D991,084 | S * | 7/2023 | Xiao | D11/143 |
| D1,034,114 | S * | 7/2024 | Han | D11/152 |
| D1,037,798 | S * | 8/2024 | Xiong | D11/143 |
| D1,058,319 | S * | 1/2025 | Csengeri | D11/152 |
| D1,058,320 | S * | 1/2025 | Csengeri | D11/152 |
| 12,295,305 | B1 * | 5/2025 | Durfee, Jr. | A01G 9/16 |

(Continued)

FOREIGN PATENT DOCUMENTS

| | | | | |
|---|---|---|---|---|
| CN | 105145134 | A * | 12/2015 | ............... A01G 9/28 |
| CN | 118716076 | A * | 10/2024 | ........... A01G 9/0299 |

(Continued)

OTHER PUBLICATIONS

Google Translation of DE202022100051 (Year: 2023).*

*Primary Examiner* — Monica L Perry
*Assistant Examiner* — Aaron M Rodziwicz
(74) *Attorney, Agent, or Firm* — ScienBiziP, P.C.

(57) ABSTRACT

A planting device includes at least one bottom board, baffles, connecting plates, and poles. The baffles are distributed on a circumference of the bottom board. The connecting plate connects adjacent two baffles. The poles are correspondingly connected to the connecting plates. The pole includes an outer plate portion and an inner plate portion, the outer plate portion is connected to the corresponding connecting plate, the inner plate portion supports the bottom board; a hollow space is formed between the outer plate portion and the inner plate portion, two sides of the outer plate portion are respectively connected to two sides of the inner plate portion to enclose the hollow space.

20 Claims, 17 Drawing Sheets

(56) References Cited

U.S. PATENT DOCUMENTS

| | | | |
|---|---|---|---|
| 2007/0089358 A1* | 4/2007 | Verkamp | A01G 9/28 47/33 |
| 2009/0320364 A1* | 12/2009 | MacKenzie | A01G 9/033 47/65.9 |
| 2010/0192460 A1* | 8/2010 | Hart | A01G 9/28 47/65.5 |
| 2011/0108788 A1* | 5/2011 | Plumb | A01G 9/28 256/25 |
| 2015/0201563 A1* | 7/2015 | Chiang | A01G 9/022 47/86 |
| 2022/0117170 A1* | 4/2022 | Barcik | A01G 9/28 |
| 2023/0116445 A1* | 4/2023 | Xiong | A01G 9/28 47/33 |
| 2023/0189722 A1* | 6/2023 | Xiong | A01G 9/02 47/33 |
| 2024/0016103 A1* | 1/2024 | Topping | A01G 9/28 |
| 2024/0130303 A1* | 4/2024 | Stetson | A01G 9/0302 |
| 2024/0389522 A1* | 11/2024 | MacKenzie | A01G 9/033 |
| 2025/0146268 A1* | 5/2025 | Buckle | A01G 9/28 |
| 2025/0241250 A1* | 7/2025 | Griffin | A01G 9/28 |

FOREIGN PATENT DOCUMENTS

| | | | | |
|---|---|---|---|---|
| CN | 118716137 A | * | 10/2024 | A01G 24/15 |
| DE | 202022104560 U1 | * | 9/2022 | A01G 9/28 |
| DE | 202022100051 U1 | * | 1/2023 | A01G 9/28 |
| DE | 202023105195 U1 | * | 12/2023 | A01G 9/28 |
| DE | 102023126700 A1 | * | 4/2025 | E04B 1/003 |
| EP | 4079145 A1 | * | 10/2022 | A01G 9/28 |
| GB | 191114174 A | * | 6/1912 | A01G 9/28 |
| KR | 20090042889 A | * | 5/2009 | A01G 9/033 |
| KR | 20240000083 U | * | 1/2024 | A01G 13/27 |
| KR | 102743741 B1 | * | 12/2024 | E01F 9/541 |
| WO | WO-2011057344 A1 | * | 5/2011 | A01G 9/28 |
| WO | WO-2013185179 A1 | * | 12/2013 | F16B 12/04 |
| WO | WO-2014165919 A1 | * | 10/2014 | A01G 25/02 |

* cited by examiner

U.S. 12,532,818 B1

PLANTING DEVICE

CROSS-REFERENCE TO RELATED APPLICATIONS

This application claims priority to Chinese Patent Application No. 202422755977.6 filed on Nov. 12, 2024, in China National Intellectual Property Administration, the contents of which are incorporated by reference herein.

FIELD

The subject matter herein generally relates to plant cultivation technology field, and more particularly to a planting device.

BACKGROUND

At present, when growing various types of plants such as vegetables, flowers, herbs, etc., planting devices such as garden beds are often used, the planting devices can contain a planting medium, such as planting soil, to provide support and growth space for the plants.

The planting device in the related art usually includes a plurality of panels and a plurality of poles, wherein the plurality of panels enclose a planting space, and the poles are arranged at the connections of the plurality of panels. The poles usually adopt an open hollow column structure with a C-shaped or U-shaped cross section and a through groove, an internal space is formed in the pole, and a through groove connecting the internal space is formed on the side of the pole. The side of the panel is usually provided with a snap-on structure, and the snap-on structures of two adjacent panels are snap-on to the inner space of the pole through a through groove, so that the pole fixes the two adjacent panels. However, the structural strength and durability of the planting device in the related art need to be improved.

BRIEF DESCRIPTION OF THE DRAWINGS

Implementations of the present disclosure will now be described, by way of embodiments, with reference to the attached figures.

DETAILED DESCRIPTION

Figure 1:
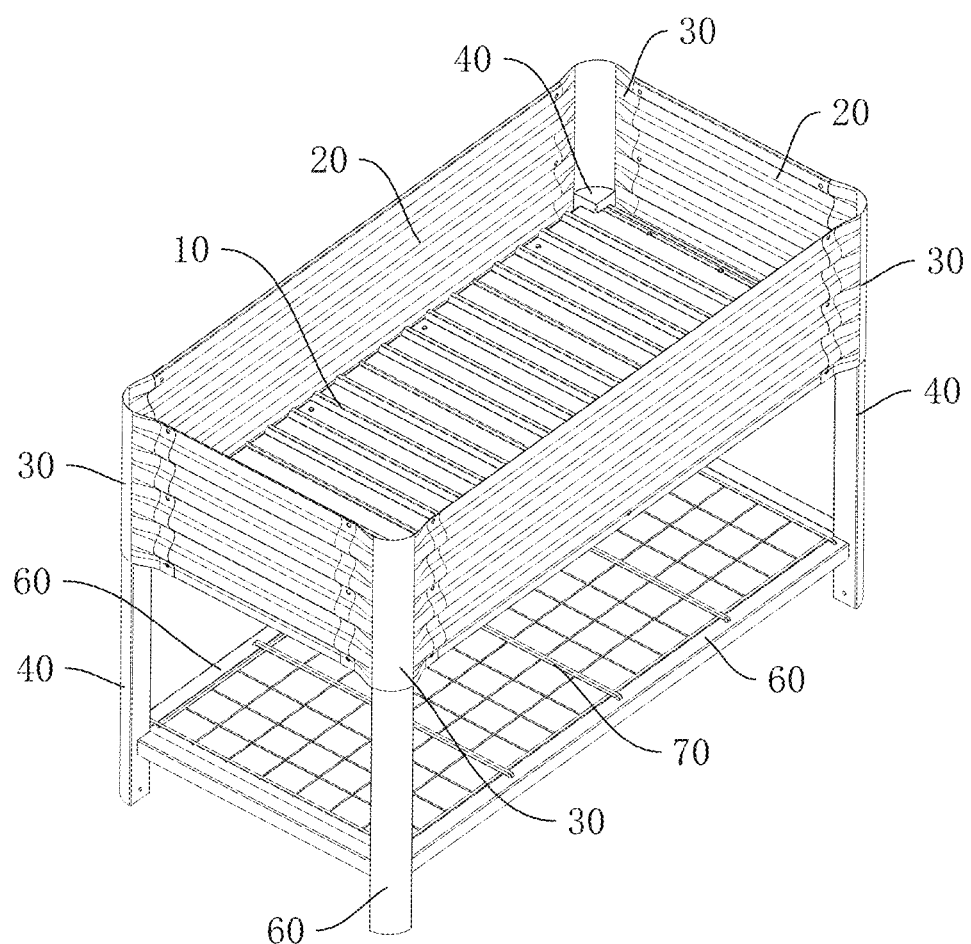
FIG. 1 is a structural diagram of first embodiment of a planting device according to the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present application provides a planting device, which has the technical effect of higher structural strength and greater durability.

Figure 2:
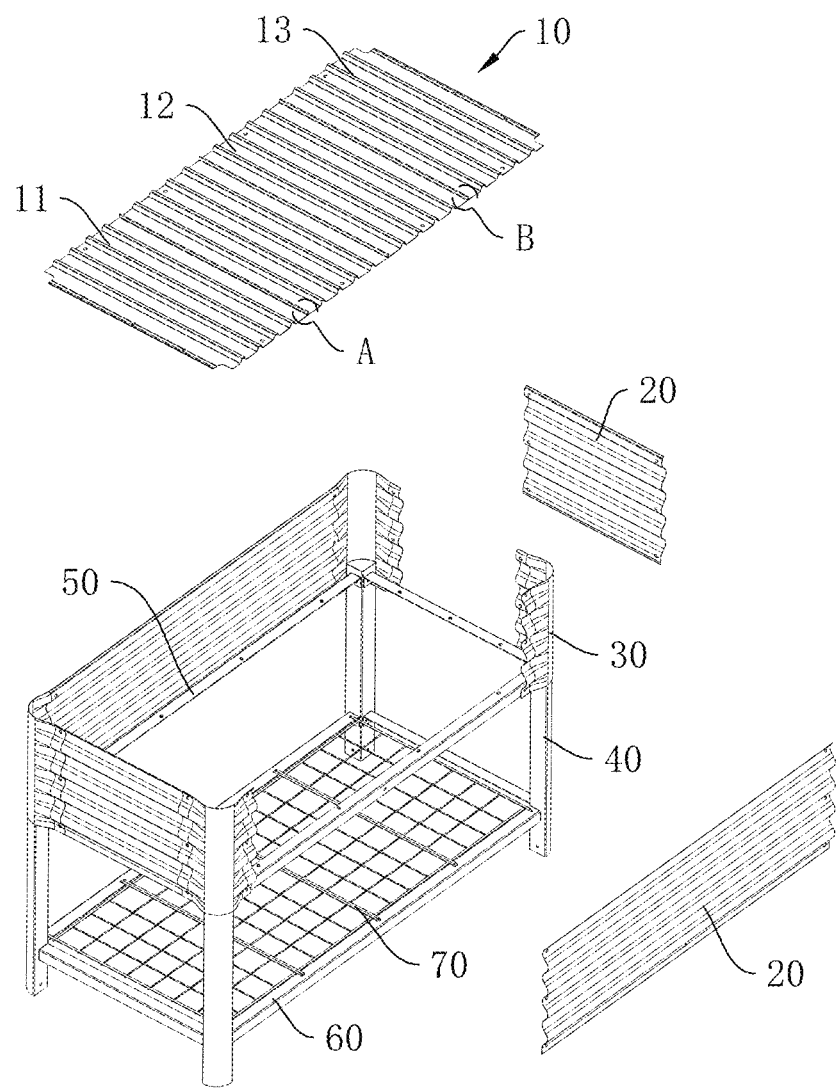
FIG. 2 is an explored view of the first embodiment of the planting device according to the present application.

The present application firstly provides a planting device. FIG. 1 is a structural diagram of the planting device according to a first embodiment of the present application. FIG. 2 is an explored view of the planting device according to the first embodiment of the present application.

Referring to FIGS. 1 and 2, the planting device includes a bottom board 10, a plurality of baffles 20, a plurality of connecting plates 30 and a plurality of poles 40. The bottom board 10 is arranged in a horizontal direction as a whole, the plurality of baffles 20 are distributed on a circumference of the bottom board 10, and a planting space is formed among the plurality of baffles 20.

Each connecting plate 30 is connected between two of the baffles 20, that is, the plurality of connecting plates 30 are arranged at the connections of the plurality of baffles 20 so that the plurality of baffles 20 are relatively fixed. The plurality of poles 40 are connected to the connecting plates 30. Each pole 40 has an outer plate portion 41 and an inner plate portion 42, the outer plate portion 41 is connected to the connecting plate 30, and the inner plate portion 42 is used to support the bottom board 10.

In actual application scenarios, the plurality of poles 40 can be placed on a fixed object such as the ground, and the plurality of poles 40 support and fix the plurality of connecting plates 30, and the plurality of connecting plates 30 fix the plurality of baffles 20. Planting medium can be accommodated in the planting space, and the bottom board 10 supports the planting medium to provide support and growth environment for plants.

Figure 3:
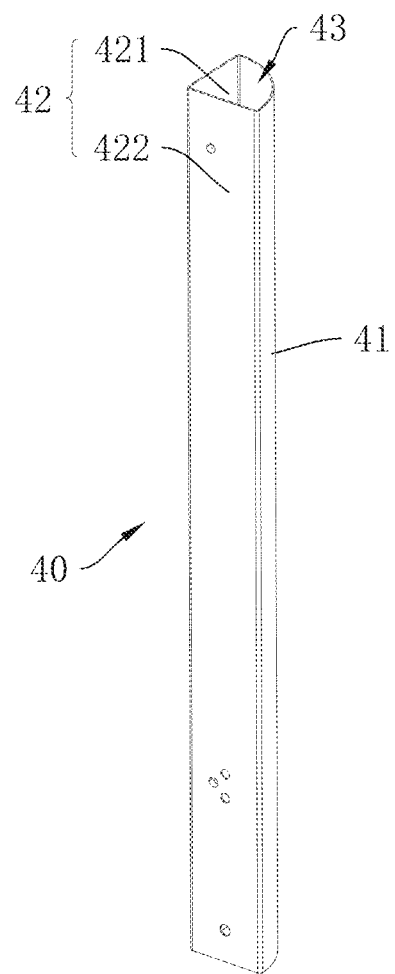
FIG. 3 is a structural diagram of a pole in the first embodiment of the planting device.

FIG. 3 is a structural diagram of the pole according to the first embodiment of the present application.

As shown in FIGS. 2 and 3, in this embodiment, a hollow space 43 is formed inside the pole 40, and openings are formed at both ends of the pole 40. Specifically, the hollow space 43 is formed between the outer plate portion 41 and the inner plate portion 42, and the two sides of the outer plate portion 41 are respectively connected to the two sides of the inner plate portion 42 to close the hollow space 43.

Thus, a cross section of the pole 40 in the vertical direction is annular, so that the pole 40 forms a closed hollow cylindrical structure. Compared with an open hollow cylindrical structure with a through groove such as a C-shape or a U-shape, the pole 40 in this embodiment has a higher rigidity and can provide a more stable supporting capacity, thereby improving an overall structural strength, durability and service life of the planting device.

It is worth noting that the structure of the closed hollow space 43 in the present application refers to the outer plate portion 41 and the inner plate portion 42 forming a continuous side structure, so that there is no through-groove structure penetrating the openings at both ends of the pole 40 on the side of the pole 40, so that the hollow space 43 is enclosed on the side of the pole 40, while the two ends of the pole 40 can still have openings. In actual applications, the openings at both ends of the pole 40 can be blocked by end covers to prevent debris from entering the interior of the pole 40.

In the example of this embodiment, the bottom board 10 is rectangular as a whole, the plurality of baffles 20 can be distributed at the edge of the bottom board 10, the plurality of connecting plates 30 and the plurality of poles 40 can be distributed at the corners of the bottom board 10.

For example, the number of baffles 20 is four, and the four baffles 20 are distributed on two long sides and two short sides of the bottom board 10, a length of the baffle 20 can be configured according to the corresponding edge length of the bottom board 10. The number of connecting plates 30 is four, and the four connecting plates 30 are distributed at four corners of the bottom board 10, and each connecting plate 30 is respectively connected to the baffles 20 of the adjacent long sides and the baffles 20 of the adjacent short sides. The number of the poles 40 is four, and the four poles 40 are distributed at the four corners of the bottom board 10, and the four poles 40 are respectively connected to the corresponding connecting plates 30. In other embodiments, the number and distribution of the baffles 20, the connecting plates 30, and the poles 40 can be adaptively adjusted according to the shape of the bottom board 10, and the present application does not limit this.

In one embodiment, the poles 40 are made of hard materials such as steel. The outer plate portion 41 of the pole 40 is curved in an arc shape, and the arc opening of the outer plate portion 41 is arranged toward the inner plate portion 42. Exemplarily, the central angle of the outer plate portion 41 may be 90°, that is, the surface of the outer plate portion 41 is arranged as a quarter of a cylinder, and the cross-sectional profile of the pole 40 in the vertical direction is fan-shaped.

By making the outer plate portion 41 curved, a contact area between the outer plate portion 41 and the connecting plate 30 can be increased, thereby improving the connection strength and the support strength.

In one embodiment, the inner plate portion 42 of the pole 40 includes a first inner plate 421 and a second inner plate 422, an angle is formed between the first inner plate 421 and the second inner plate 422, and an opening of the angle is disposed toward the outer plate portion 41. The first inner plate 421 is connected to one side of the outer plate portion 41, and the second inner plate 422 is connected to the other side of the outer plate portion 41. The first inner plate 421 of the inner plate portion 42 is disposed opposite to the second inner plate 422 adjacent to the inner plate portion 42.

In this way, the first inner plate 421 and the second inner plate 422 cooperate to close the arc-shaped opening of the outer plate portion 41 to form a closed structure. Exemplarily, the inner plate portion 42 is bent in the middle to form the first inner plate 421 and the second inner plate 422, the angle between the first inner plate 421 and the second inner plate 422 may be 90°. The inner plate 42 portion can be fixedly connected to the outer plate portion 41 by welding, integral molding, etc.

The outer plate portion 41, the first inner plate 421, and the second inner plate 422 are combined to form a triangular structure, so that the pole 40 as a whole has stronger rigidity, is less prone to bending and deformation, and can provide stronger supporting capabilities.

On the other hand, the hollow space 43 enclosed by the outer plate portion 41, the first inner plate 421, and the second inner plate 422 can reduce the overall mass of the pole 40, facilitate a transportation and production of the pole 40, and improve production efficiency.

Figure 4:
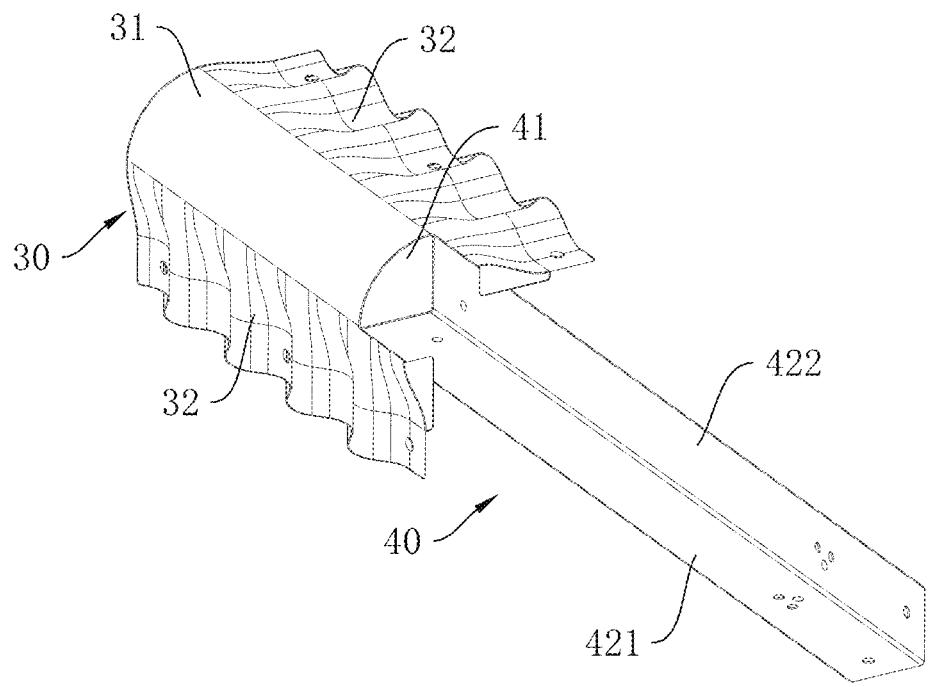
FIG. 4 is a structural diagram of the pole and a connecting plate of the first embodiment of the planting device.

FIG. 4 is a structural diagram of the pole and the connecting plate according to the first embodiment of the present application.

As shown in FIGS. 2 and 4, in one embodiment, the connecting plate 30 is made of a hard material such as steel. The connecting plate 30 has a fixing portion 31 and a connecting portion 32. The fixing portion 31 is provided with an arc surface adapted to the outer plate portion 41, the arc surface is fixed to the outer plate portion 41, the connecting portion 32 is detachably connected to the baffles 20. Exemplarily, the fixing portion 31 is bent in an arc shape as a whole, and a curvature of the fixing portion 31 matches a curvature of the outer plate portion 41, so that the fixing portion 31 can be closely attached to the outer plate portion 41. The fixing portion 31 and the connecting portion 32 are integrally formed and fixed, and each connecting plate 30 is configured with two connecting portions 32, which can be formed by bending two sides of the fixing portion 31.

The connecting plate 30 is fixedly connected to the outer plate portion 41 via the fixing portion 31, thereby increasing a contact area with the outer plate portion 41 and improving the connection stability. At the same time, a sharpness of the edge of the connecting plate 30 can be reduced, reducing the risk of scratching human skin and improving safety. The connecting plate 30 is detachably connected to the baffle 20 via the connecting portion 32, so as to facilitate an assembly and disassembly of the baffle 20.

In one embodiment, the connecting plate 30 is fixed to the pole 40 by welding. Specifically, the fixing portion 31 is fixed to the outer plate portion 41 by welding. In this way, the connection stability between the connecting plate 30 and the pole 40 can be improved. In addition, when the planting device is disassembled for transportation, the connecting plate 30 and the pole 40 can be transported as a whole, and when the planting device is assembled, the baffle 20 can be directly fixed to the connecting plate 30, thereby reducing the difficulty of assembly.

In the example of this embodiment, the connecting plate 30 and the pole 40 are fixed by welding. In other embodiments, the connecting plate 30 and the pole 40 can also be fixed by bolting, clamping, etc., as long as the connecting plate 30 and the pole 40 can be stably connected, and this application does not impose any restrictions on this.

In one embodiment, the baffle 20 is made of a hard material such as steel. The baffle 20 is extended along the edge of the bottom board 10. Both ends of the baffle 20 are respectively connected to the connecting portions 32 of the adjacent connecting plates 30. Exemplarily, the baffle 20 has an uneven corrugated structure, the connecting portion 32 is provided with a corresponding concave-convex structure so that the connecting portion 32 can be closely attached to the baffle 20. An end of the baffle 20 is provided with a plurality of first through holes, the connecting portion 32 is provided with a plurality of corresponding second through holes. The first through holes and the second through holes can be provided for bolt mounting, so that the baffle 20 and the connecting portion 32 are bolted and fixed.

In the example of this embodiment, the baffle 20 and the connecting plate 30 are detachably fixed by bolting. In other embodiments, the baffle 20 and the connecting plate 30 can also be detachably fixed by snapping or other methods, which is not limited in this application.

Figure 5:
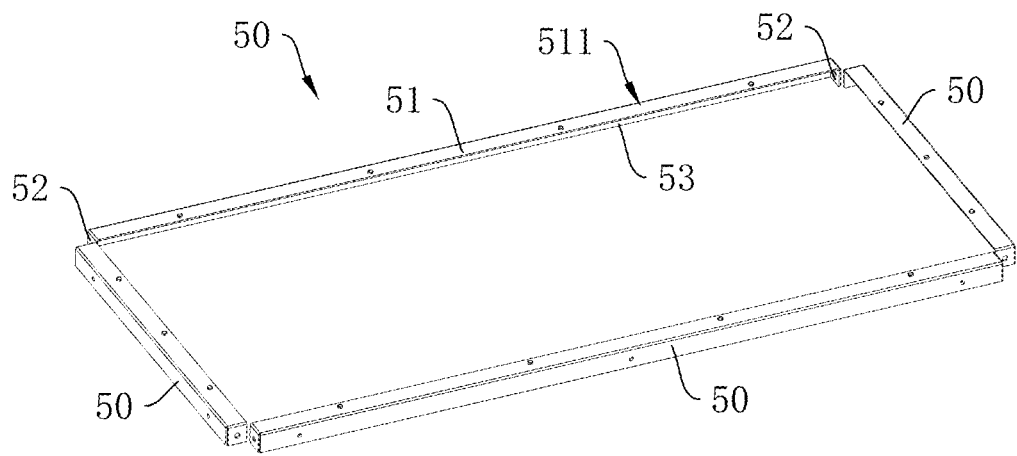
FIG. 5 is a structural diagram of a support assembly according to the first embodiment of the present application.

FIG. 5 is a structural diagram of a support assembly according to the first embodiment of the present application.

As shown in FIGS. 2 and 5, in one embodiment, the planting device further includes a support assembly, the support assembly is connected to the plurality of poles 40, the support assembly is used to support the bottom board 10. The support assembly includes a plurality of support members 50, the plurality of support members 50 are distributed on the circumference of the bottom board 10, the bottom board 10 is arranged on the plurality of support members 50. Each support member 50 is disposed between two adjacent poles 40, two ends of the support member 50 are respectively connected to the two adjacent poles 40.

Specifically, the two ends of the support member 50 are respectively connected to the first inner plate 421 and the second inner plate 422 that are relatively arranged, the relative arrangement includes relative arrangement along the length direction of the bottom board 10 and relative arrangement along the width direction of the bottom board 10.

The plurality of support members 50 can be combined to form a frame structure to support and fix the bottom board 10, thereby improving the mounting stability of the bottom board 10.

In the example of this embodiment, the plurality of support members 50 are distributed at the edge of the bottom board 10, a length of the support member 50 can be configured according to the length of the edge corresponding to the bottom board 10. Exemplarily, the number of the support members 50 is four, and the four support members 50 are distributed at the two long sides and the two short sides of the bottom board 10. In other embodiments, the number and distribution of the support members 50 can be adaptively adjusted according to the shape of the bottom board 10, and the present application is not limited thereto.

Figure 6:
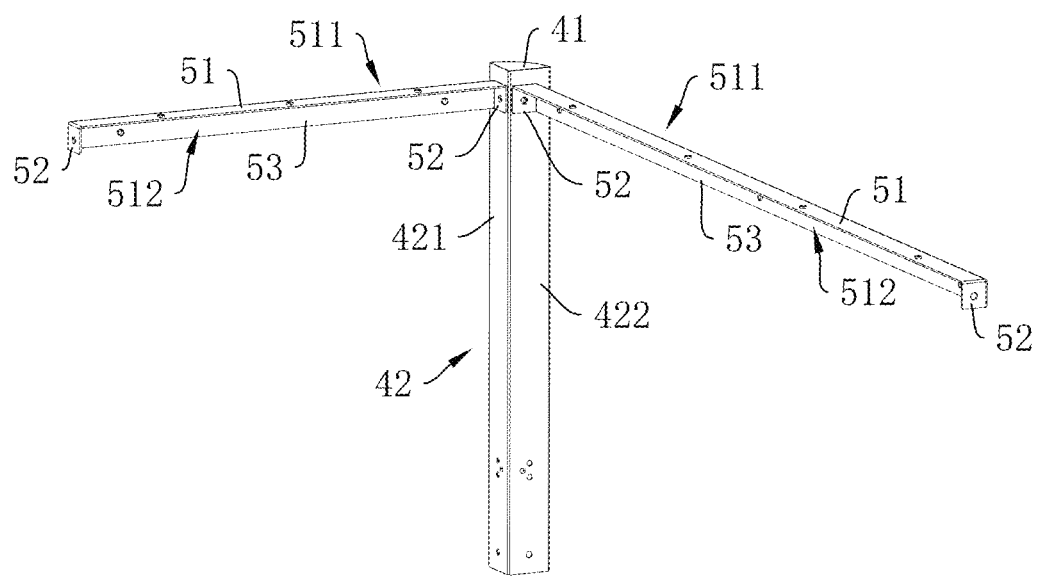
FIG. 6 is a structural diagram of support members and the pole according to the first embodiment of the present application.

FIG. 6 is a structural diagram of the support members and the pole according to the first embodiment of the present application.

As shown in FIGS. 2, 5, and 6, in one embodiment, the support member 50 has a transverse plate 51 and connecting pieces 52. The connecting pieces 52 are disposed at ends of the transverse plate 51, an angle is formed between the connecting pieces 52 and the transverse plate 51. The connecting pieces 52 are fixed to the inner plate portion 42, the transverse plate 51 can be placed on the bottom board 10.

For example, the transverse plate 51 and the connecting pieces 52 are integrally formed and fixed, and each transverse plate 51 is provided with two connecting pieces 52, which can be formed by bending two ends of the transverse plate 51, the angle between the connecting piece 52 and the transverse plate 51 may be 90°. The connecting piece 52 at one end of the transverse plate 51 is bolted and fixed to the first inner plate 421, the connecting piece 52 at the other end of the transverse plate 51 is bolted and fixed to the second inner plate 422.

The two ends of the transverse plate 51 are fixed between two poles 40 through the connecting plates 52 respectively, so that the plurality of transverse plates 51 are combined to form a frame structure. The bottom board 10 can be placed on an upper surface of the transverse plate 51 and fixedly connected to the transverse plate 51, so that the bottom board 10 can be stably mounted between the plurality of poles 40.

Figure 7:
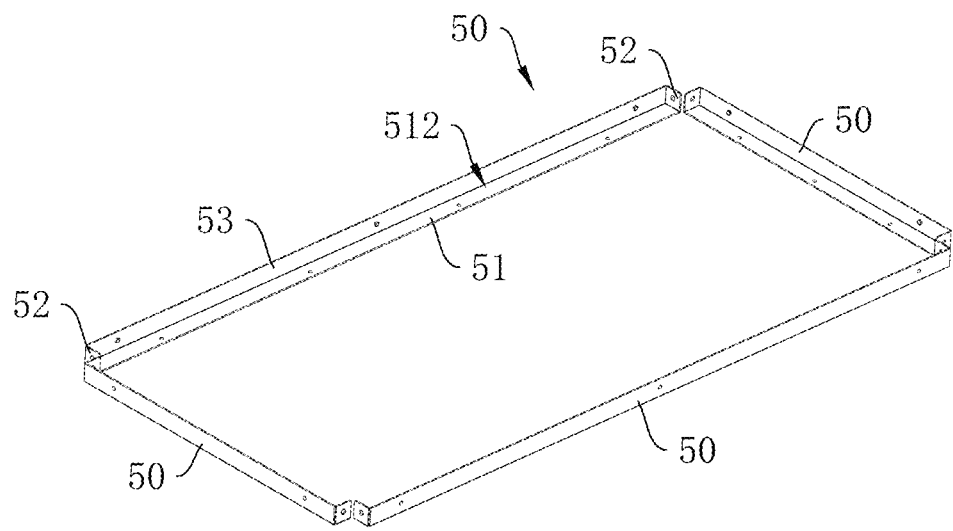
FIG. 7 is a structural diagram of when the support assembly is flipped over according to the first embodiment of the present application.

FIG. 7 is a structural diagram of when the support assembly is flipped over according to the first embodiment of the present application.

As shown in FIGS. 5, 6, and 7, in one embodiment, two opposite sides of the transverse plate 51 form a first supporting surface 511 and a second supporting surface 512. The first supporting surface 511 is a side of the transverse plate 51 facing away from the connecting pieces 52, the second supporting surface 512 is a side of the transverse plate 51 facing the connecting pieces 52. When the transverse plate 51 is fixed between the two posts 40, the transverse plate 51 is allowed to be mounted and fixed with the first supporting surface 511 facing upward, the transverse plate 51 is also allowed to be flipped and mounted with the second supporting surface 512 facing upward.

When the first supporting surface 511 is arranged upward, the transverse plate 51 is located at an upper end of the connecting piece 52, the transverse plate 51 supports the bottom board 10 at a first height through the first supporting surface 511.

When the second support surface 512 is arranged upward, that is, when the support member 50 is mounted in a flipped over manner, the transverse plate 51 is located at the lower end of the connecting piece 52, and the transverse plate 51 supports the bottom board 10 at a second height through the second support surface 512. The first height is higher than the second height.

The mounting method of each support member 50 is unified, that is, when any transverse plate 51 is arranged with the first support surface 511 facing upward, all other transverse plates 51 are arranged with the first support surface 511 facing upward, so that the first support surface 511 of each transverse plate 51 are flush. When any one transverse plate 51 is arranged with the second supporting surface 512 facing upward, all other transverse plates 51 are arranged with the second supporting surfaces 512 facing upward, so that the second supporting surfaces 512 of each transverse plate 51 are aligned, thereby achieving a stable supporting effect.

In this way, by utilizing the reversible mounting structure of the support member 50, support effects of different heights can be achieved, and then the height and planting depth of the bottom board 10 can be adjusted, thereby improving the applicability to different planting scenes.

In one embodiment, the transverse plate 51 is fixedly connected to the bottom board 10. Exemplarily, the transverse plate 51 is provided with a plurality of third through holes, and the bottom board 10 is provided with a corresponding plurality of fourth through holes, the third through holes and the fourth through holes can be provided for bolts to be mounted, so that the transverse plate 51 is bolted and fixed to the bottom board 10. In this way, the connection stability between the bottom board 10 and the transverse plate 51 is improved.

As shown in FIGS. 2, 5, and 6, in one embodiment, the support member 50 further includes a side plate 53, which is disposed on the side of the transverse plate 51 and fixed to the baffle 20. Exemplarily, the side plate 53 and the transverse plate 51 are integrally formed and fixed, and the side plate 53 can be formed by bending the side of the transverse plate 51, the angle between the side plate 53 and the transverse plate 51 may be 90°. The side plate 53 is provided with a plurality of fifth through holes, the baffle plate 20 is provided with a corresponding plurality of sixth through holes. The fifth through holes and the sixth through holes can be provided for bolt mounting, so that the side plate 53 and the baffle plate 20 are bolted and fixed.

In this way, the support member 50 can be fixedly connected to the bottom board 10 through the transverse plates 51, fixedly connected to the poles 40 through the connecting plates 52, and fixedly connected to the baffles 20 through the side plates 53, so as to strengthen the connection strength between the bottom board 10, the poles 40, and the baffles 20, and improve the overall rigidity.

Figure 8:
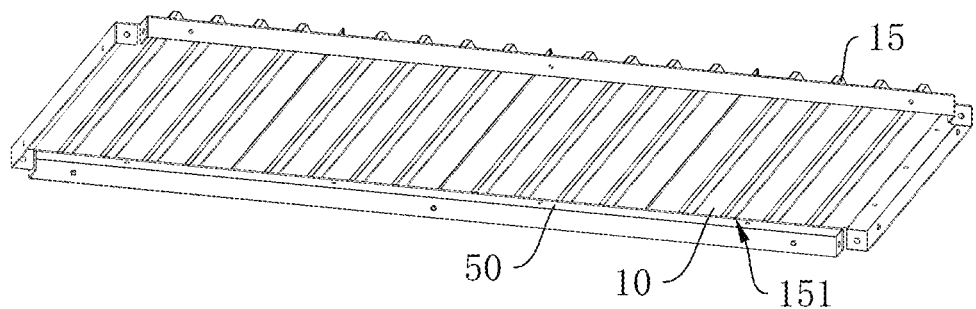
FIG. 8 is a structural diagram of a bottom board and the support members of the present application.

FIG. 8 is a structural diagram of the bottom board and the support members of the present application.

As shown in FIGS. 5 and 8, in one embodiment, the bottom board 10 is provided with a plurality of convex strips 15, and a ventilation channel 151 is formed between the convex strips 15 and the support members 50. Exemplarily, the bottom board 10 is provided with the plurality of convex strips 15 along its length direction, and the convex strips 15 are formed by bending the bottom board 10. The plurality of convex strips 15 form upwardly arched strip structures on the bottom board 10. When the bottom board 10 is arranged on the transverse plates 51 of the support member 50, the ventilation channel 151 is formed between the convex strips 15 and the transverse plates 51. The ventilation channel 151 facilitates ventilation of the bottom soil arranged on the bottom board 10, promotes air circulation inside the soil, and is beneficial to the healthy growth of plants.

As shown in FIG. 2, in one embodiment, there may be a plurality of bottom boards 10, the plurality of bottom boards 10 include a first bottom board 11 and a second bottom board 13. The first bottom board 11 and the second bottom board 13 are distributed along the length direction of the bottom board 10, a buckle structure is provided between the first bottom board 11 and the second bottom board 13. Exemplarily, the buckle structure includes a flange and a hook, the flange extends upward, a hook-shaped opening of the hook is arranged downward, the flange is embedded upward into the hook, and the hook overlaps the flange to form a buckle fit.

In this way, the first bottom board 11 and the second bottom board 13 can be assembled into a whole, or can be separated into different units, which is convenient for the production and transportation of the bottom board 10 and improves production efficiency. In addition, the first bottom board 11 and the second bottom board 13 are connected by the buckle structure, which can improve the overall structural strength and connection stability of the first bottom board 11 and the second bottom board 13.

In one embodiment, the plurality of bottom boards 10 also include a connecting bottom board 12, the first bottom board 11, the connecting bottom board 12, and the second bottom board 13 are laid in sequence along the length direction of the bottom boards 10, that is, the first bottom board 11 and the second bottom board 13 form the two ends of the bottom boards 10, the connecting bottom board 12 forms the middle part of the bottom boards 10. Both ends of the connecting bottom board 12 are provided with the buckle structures. One end of the connecting bottom board 12 is buckled with the first bottom board 11 through the buckle structure, the other end of the connecting bottom board 12 is buckled with the second bottom board 13 through the buckle structure.

Figure 9:
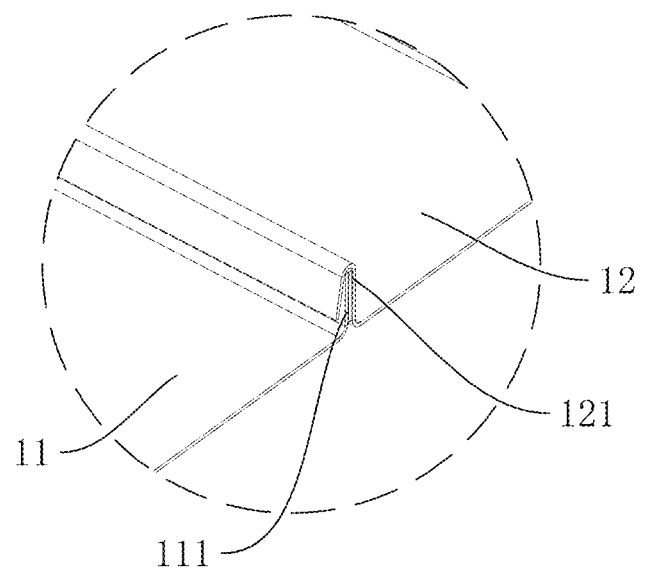
FIG. 9 is a partial enlarged diagram of A in FIG. 2.
Figure 10:
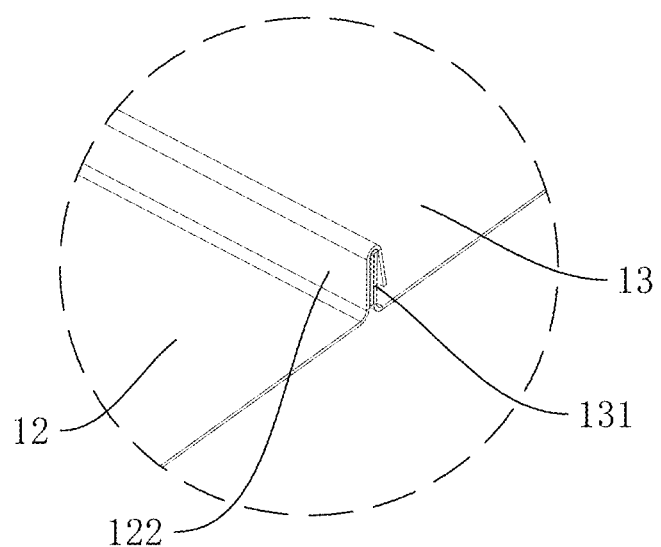
FIG. 10 is a partial enlarged diagram of B in FIG. 2.

FIG. 9 is a partial enlarged diagram of A in FIG. 2. FIG. 10 is a partial enlarged diagram of B in FIG. 2.

As shown in FIGS. 2, 9, and 10, exemplarily, the buckle structure includes a first flange 111, a first hook 121, a second flange 131, and a second hook 122.

The first hook 121 and the second hook 122 are respectively disposed at the two ends of the connecting bottom board 12. The first flange 111 is disposed at the end of the first bottom board 11, and the first hook 121 is used to buckle the first flange 111. The second flange 131 is disposed at the end of the second bottom board 13, and the second hook 122 is used to buckle the second flange 131.

Exemplarily, the first hook 121 is formed by bending the end of the connecting bottom board 12, a hook-shaped opening of the first hook 121 is set downward. The second hook 122 is formed by bending the end of the connecting bottom board 12, a hook-shaped opening of the second hook 122 is set downward. The first flange 111 is formed by bending the first bottom board 11 toward one end of the connecting bottom board 12 upward, the second flange 131 is formed by bending the second bottom board 13 toward one end of the connecting bottom board 12 upward.

The first hook 121 of the connecting bottom board 12 overlaps the first flange 111 of the first bottom board 11, so that the first flange 111 is embedded upwardly in the first hook 121, the first flange 111 and the first hook 121 form a buckle fit. The second hook 122 of the connecting bottom board 12 overlaps the second flange 131 of the second bottom board 13, so that the second flange 131 is embedded upwardly in the second hook 122, the second flange 131 and the second hook 122 form a buckle fit.

In this way, by forming the buckle fit between the first bottom board 11, the connecting bottom board 12 and the second bottom board 13, the overall structural strength and connection stability of the first bottom board 11, the connecting bottom board 12 and the second bottom board 13 are improved.

The first bottom board 11, the connecting bottom board 12 or the second bottom board 13 itself can be a single board, or it can be formed by multiple boards connected end to end, and the present application does not limit this.

Figure 11:
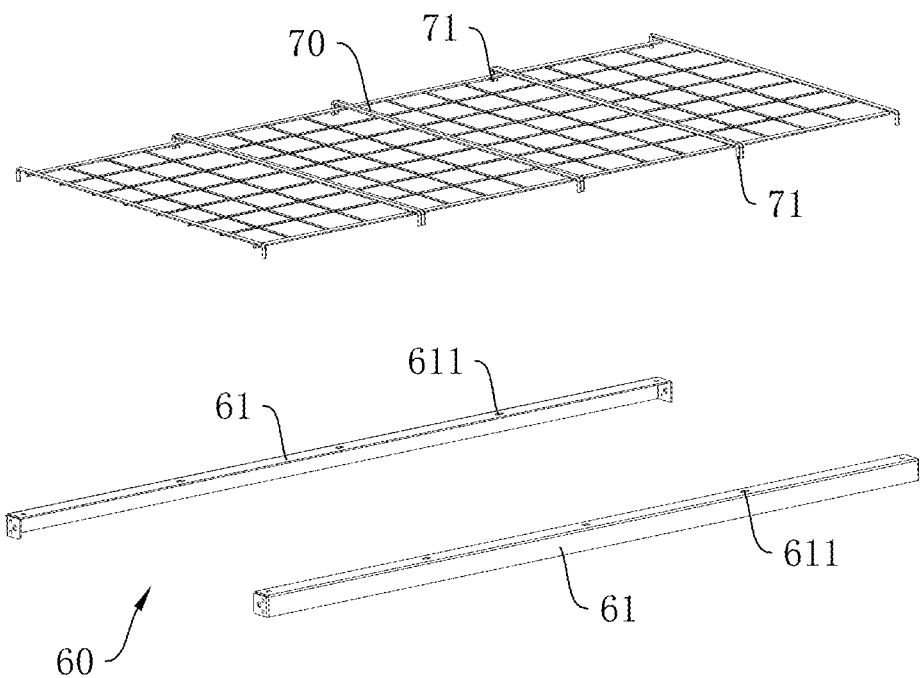
FIG. 11 is an explored view of a base frame and a storage rack according to the first embodiment of the present application.

FIG. 11 is an explored view of a base frame and a storage rack according to the first embodiment of the present application.

As shown in FIGS. 2 and 11, in one embodiment, the planting device further includes a base frame 60 and a storage rack 70. The base frame 60 is disposed below the bottom board 10, the base frame 60 is connected to the plurality of poles 40. The storage rack 70 is disposed on the base frame 60, the storage rack 70 can be used by users to place items such as planting tools.

Exemplarily, the base frame 60 includes two cross bars 61, which are arranged opposite to each other along the width direction of the bottom board 10, the two ends of the cross bars 61 are respectively bolted and fixed to two adjacent poles 40. The cross bars 61 are provided with a plurality of insertion holes 611. The storage rack 70 is in a grid shape, two sides of the storage rack 70 are provided with insertion strips 71 corresponding to the insertion holes 611. The storage rack 70 is placed on each cross bar 61, the storage rack 70 is inserted into the insertion holes 611 of the cross bars 61 through the insertion strips 71, so that the storage rack 70 is relatively fixed to the cross bars 61. The storage rack 70 and the base frame 60 are fixed by plugging, which facilitates the disassembly and assembly of the storage rack 70 and improves the user experience.

Figure 12:
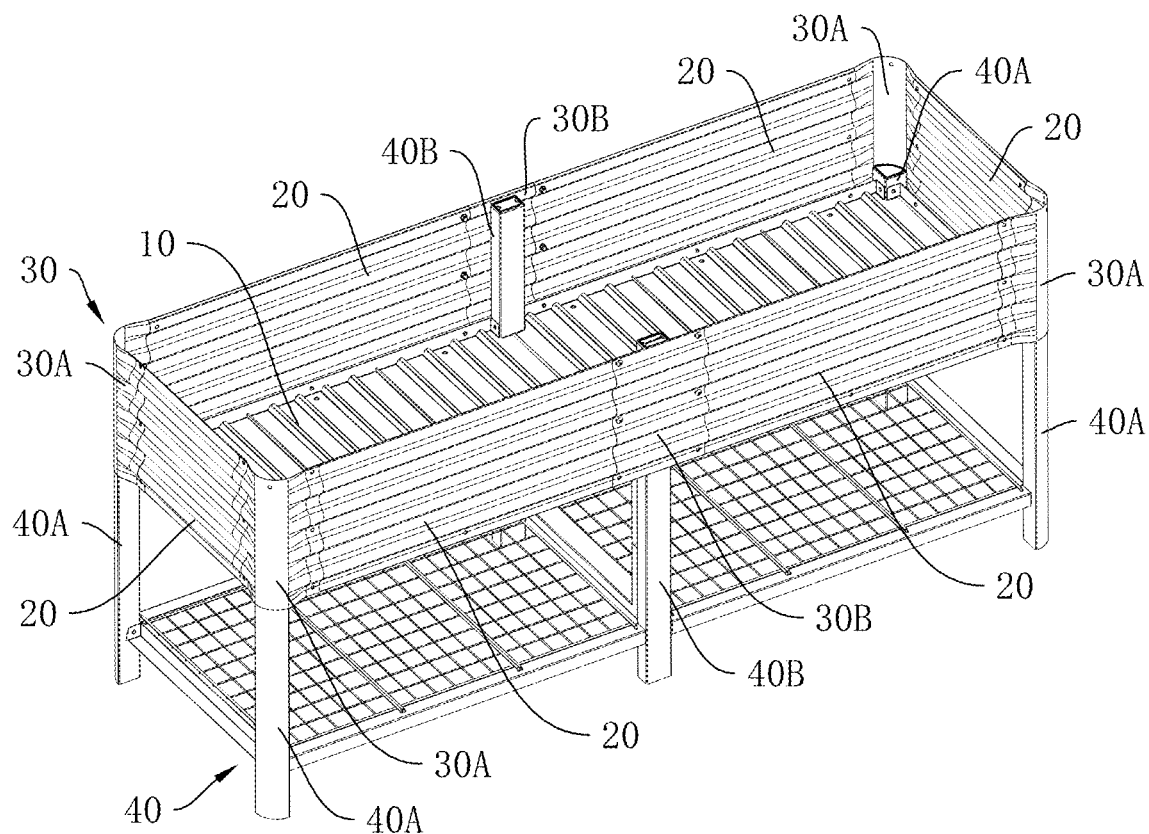
FIG. 12 is a structural diagram of the planting device according to a second embodiment of the present application.
Figure 13:
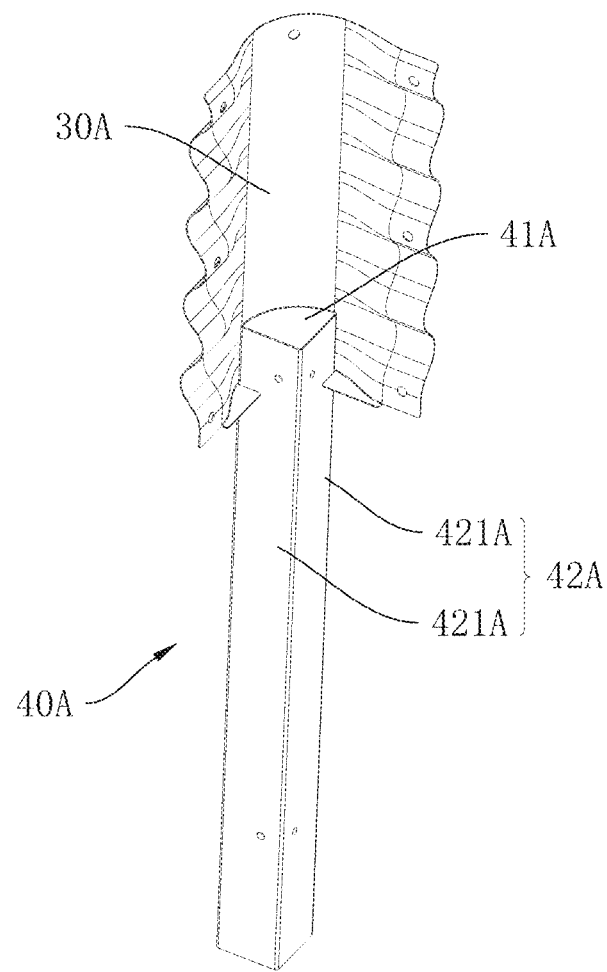
FIG. 13 is a first structural diagram of the pole and the connecting plate according to the second embodiment of the present application.
Figure 14:
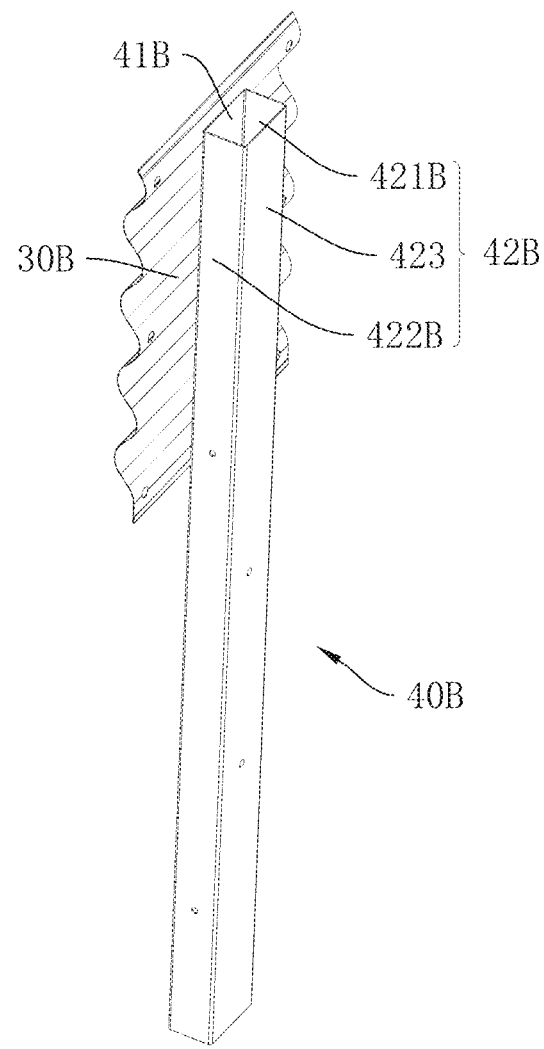
FIG. 14 is a second structural diagram of the pole and the connecting plate according to the second embodiment of the present application.

FIG. 12 is a structural diagram of the planting device according to a second embodiment provided by the present application. FIG. 13 is a first structural diagram of the pole and the connecting plate according to the second embodiment of the present application. FIG. 14 is a second structural diagram of the pole and the connecting plate according to the second embodiment of the present application.

As shown in FIGS. 11, 12 and 13, the differences between this embodiment and the first embodiment include: the overall length of the planting device in this embodiment is greater than the overall length of the planting device in the first embodiment.

In this embodiment, the poles 40 include multiple types, the multiple poles 40 can be divided into poles 40A and poles 40B. The poles 40A are arranged at the corners of the bottom board 10, and the poles 40B are arranged at the middle of the edge of the bottom board 10.

In the example of this embodiment, the bottom board 10 is rectangular as a whole, the number of the poles 40A is four, and the four poles 40A are distributed at the four corners of the bottom board 10. The number of the poles 40B is two, and the two columns 40B are distributed in the middle of the two long sides of the bottom board 10.

Each pole 40A has an outer plate portion 41A and an inner plate portion 42A. The inner plate portion 42A includes a first inner plate 421A and a second inner plate 422A. The outer plate portion 41A is curved, there is an angle between the first inner plate 421A and the second inner plate 422A, so that the cross-sectional profile of the pole 40A in the vertical direction is substantially fan-shaped.

Each pole 40B has an outer plate portion 41B and an inner plate portion 42B, the inner plate portion 42B includes a first inner plate 421B, a second inner plate 422B, and a third inner plate 423, the outer plate portion 41B is parallel to the length direction of the bottom board 10, the third inner plate 423 is connected between the first inner plate 421B and the second inner plate 422B, the third inner plate 423 and the outer plate portion 41B are parallel to each other, the first inner plate 421B and the second inner plate 422B are parallel to each other, so that the cross-sectional profile of the pole 40B in the vertical direction is substantially rectangular.

The connecting plate 30 includes multiple types, the multiple connecting plates 30 can be divided into connecting plates 30A and connecting plates 30B. The connecting plates 30A are arranged at the corners of the bottom board 10, and the connecting plates 30B are arranged at the middle of the edge of the bottom board 10.

Each connecting plate 30A is curved as a whole and is matched with the outer plate portion 41A. The connecting plate 30A is connected to the pole 40A, the connecting plate 30A can connect two baffles 20 with an angle.

Each connecting plate 30B is parallel to the outer plate portion 41B. The connecting plate 30B is connected to the pole 40B. Two baffles 20 are arranged on the long side of the bottom board 10, the connecting plate 30B can connect the two baffles 20 located on the same side of the bottom board 10.

Figure 15:
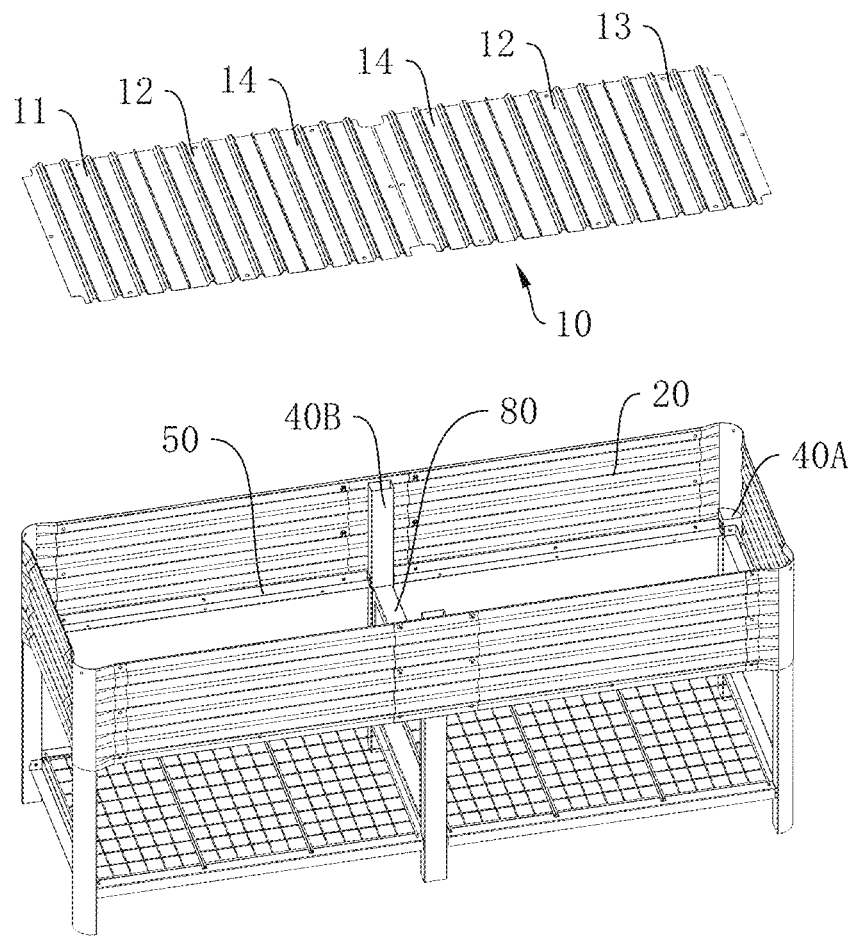
FIG. 15 is an explored diagram of the bottom board and the support members according to the second embodiment of the present application.

FIG. 15 is an explored diagram of the bottom board and the support members according to the second embodiment of the present application.

As shown in FIGS. 12 and 15, in one embodiment, a cross column 80 is disposed between the two poles 40B, both ends of the cross column 80 are respectively fixed to the two poles 40B. The cross column 80 is used to support and fix the middle part of the bottom board 10 to improve the mounting stability of the bottom board 10.

In one embodiment, the bottom board 10 further includes transition bottom boards 14. There are multiple connecting bottom boards 12, the transition bottom boards 14 are located between the multiple connecting bottom boards 12. One end of the transition bottom boards 14 are fixed to the cross column 80, and the other end of the transition bottom boards 14 are buckled with the connecting bottom boards 12 through the buckle structures.

Exemplarily, the number of the connecting bottom boards 12 is two. The number of the transition bottom boards 14 is two, two transition bottom boards 14 are located between the two connecting bottom boards 12, the cross column 80 is located between the two transition bottom boards 14. One end of one of the connecting bottom boards 12 is buckled to the first bottom board 11, the other end is buckled to the adjacent transition bottom board 14; one end of the other connecting bottom board 12 is buckled to the second bottom board 13, and the other end is buckled to another adjacent transition bottom board 14.

In this way, by forming a buckle fit between the first bottom board 11, the connecting bottom board 12, the transition bottom board 14 and the second bottom board 13, the overall structural strength and connection stability of the first bottom board 11, the connecting bottom board 12, the transition bottom board 14, and the second bottom board 13 are improved.

Figure 16:
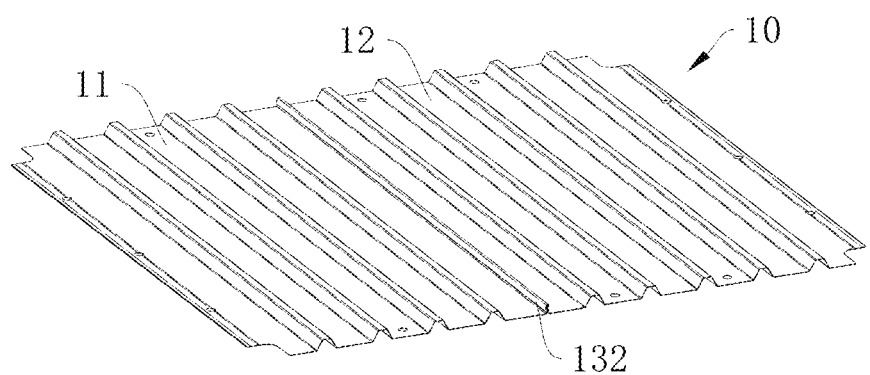
FIG. 16 is a structural diagram of the bottom board according to a third embodiment of the present application.
Figure 17:
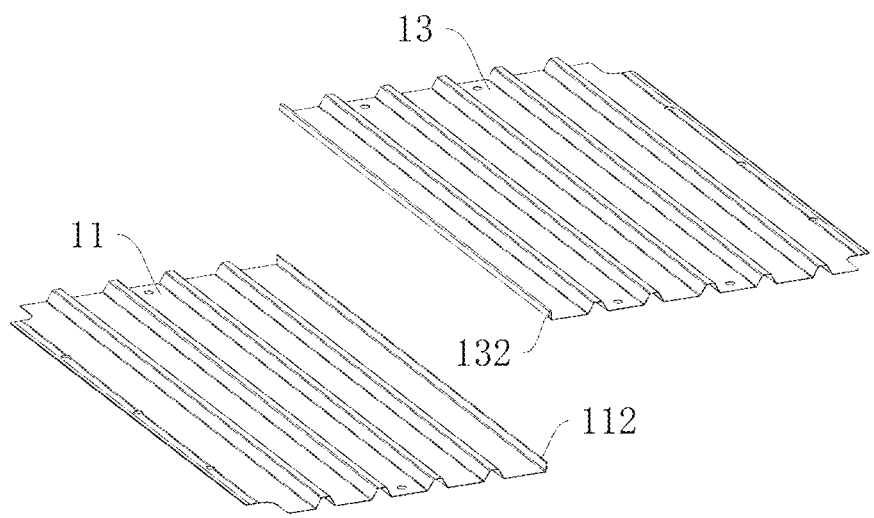
FIG. 17 is an explored diagram of a first bottom board and a second bottom board according to the third embodiment of the present application.

FIG. 16 is a structural diagram of the bottom board according to a third embodiment of the present application. FIG. 17 is an explored diagram of a first bottom board and a second bottom board according to the third embodiment of the present application.

As shown in FIGS. 16 and 17, the difference between this embodiment and the first embodiment includes: the bottom board 10 is composed of a first bottom board 11 and a second bottom board 13. The buckle structure includes a third flange 112 and a third hook 132, the third flange 112 is arranged at one end of the first bottom board 11 facing the second bottom board 13, the third flange 112 is formed by bending the end of the first bottom board 11 upward. The third hook 132 is disposed at one end of the second bottom board 13 facing the first bottom board 11. The third hook 132 is formed by bending the second bottom board 13, a hook-shaped opening of the third hook 132 is disposed downward. The third hook 132 overlaps the third flange 112, so that the third flange 112 is upwardly embedded in the third hook 132, the third flange 112 and the third hook 132 form a buckle fit.

The first, second, and third embodiments of the present application are intended to describe the expanded forms and matching relationships of the structures such as the poles 40, the connecting plates 30, and the bottom board 10 in different scenarios, and are not intended to be specific limitations on the structures such as the poles 40, the connecting plates 30 and the bottom board 10. For example, although the poles 40A and 40B have different cross-sectional profiles, they still belong to the same closed hollow pole structure. In other embodiments, if the length, width, profile, etc. of the bottom board 10 are changed, the poles 40, the connecting plates 30, the bottom board 10 and other structures can also be adaptively adjusted, and this application does not limit this.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A planting device comprising:
   at least one bottom board;
   a plurality of baffles distributed on a circumference of the bottom board;
   a plurality of connecting plates, each of the plurality of connecting plates connecting adjacent two baffles of the plurality of baffles;
   a plurality of poles correspondingly connected to the plurality of connecting plates, and
   a support assembly, the support assembly comprising a plurality of support members, the plurality of support members distributed on a circumference of the bottom board, the bottom board arranged on the plurality of support members,
   wherein each of the plurality of poles comprises an outer plate portion and an inner plate portion, the outer plate portion is connected to the corresponding connecting plate, the inner plate portion is configured to support the bottom board; a hollow space is formed between the outer plate portion and the inner plate portion, two sides of the outer plate portion are respectively connected to two sides of the inner plate portion to enclose the hollow space;
   the bottom board is provided with a plurality of convex strips, and a ventilation channel is formed between the plurality of convex strips and the plurality of support members.

2. The planting device of claim 1, wherein the outer plate portion is curved in an arc shape, and an opening, having the arc shape, of the outer plate portion is arranged toward the inner plate portion.

3. The planting device of claim 2, wherein the inner plate portion comprises a first inner plate and a second inner plate, the first inner plate and the second inner plate intersect with each other, an opening between the first and the second inner plates is disposed toward the outer plate portion, the first inner plate is connected to one side of the outer plate portion, and the second inner plate is connected to another side of the outer plate portion.

4. The planting device of claim 2, wherein each of the plurality of connecting plates comprises a fixing portion and at least one connecting portion, the fixing portion is provided with an arc surface adapted to the arc shape of the outer plate portion, the arc surface is fixed to the outer plate portion, the connecting portion is detachably connected to the adjacent two baffles.

5. The planting device of claim 4, wherein the fixing portion and the connecting portion are integrally formed and fixed, each of the plurality of connecting plates comprises two connecting portions, the two connecting portions are formed by bending two sides of the fixing portion.

6. The planting device of claim 4, wherein the fixing portion is fixed to the outer plate portion by welding.

7. The planting device of claim 3, further comprising a support assembly, wherein two ends of each of the plurality of support members are respectively connected to two adjacent poles of the plurality of poles.

8. The planting device of claim 7, wherein the first inner plate of the inner plate portion of a pole of the plurality of poles is arranged opposite to the second inner plate of the inner plate portion of an adjacent pole of the plurality of poles, two ends of each of the plurality of the support members are respectively connected to the first inner plate and the second inner plate arranged opposite to each other.

9. The planting device of claim 7, wherein each of the plurality of the support members comprises a transverse plate and at least one connecting piece, the at least one connecting piece is arranged at ends of the transverse plate, the at least one connecting piece intersects with the transverse plate, the at least one connecting pieces is fixed to the inner plate portion.

10. The planting device of claim 9, wherein the transverse plate and the at least one connecting piece is integrally formed and fixed, the transverse plate comprises two connecting pieces, the two connecting pieces are formed by bending two ends of the transverse plate.

11. The planting device of claim 9, wherein two opposite sides of the transverse plate form a first supporting surface and a second supporting surface, when the first supporting surface is arranged upward, the first supporting surface supports the bottom board at a first height; when the second support surface is arranged upward, the second support surface supports the bottom board at a second height, the first height is higher than the second height.

12. The planting device structure of claim 11, wherein the first supporting surface is a side of the transverse plate facing away from the connecting pieces, the second supporting surface is a side of the transverse plate facing the connecting pieces.

13. The planting device of claim 11, wherein each of the plurality of the support members further comprises a side plate, the side plate is disposed on a side of the transverse plate and fixed to the adjacent two baffles.

14. The planting device of claim 13, wherein the side plate and the transverse plate are integrally formed and fixed, the side plate is formed by bending a side of the transverse plate, an angle between the side plate and the transverse plate is 90°.

15. The planting device of claim 13, wherein each of the plurality of the support members is fixedly connected to the bottom board through the transverse plate, and fixedly connected to the corresponding pole through the connecting plates, and further fixedly connected to the adjacent two baffles through the side plates, so as to strengthen a connection strength between the bottom board, the plurality of poles, and the plurality of baffles.

16. The planting device of claim 7, wherein the planting device comprises a first bottom board and a second bottom board, the first bottom board and the second bottom board are distributed along a same plane, buckle structures are provided between the first bottom board and the second bottom board.

17. The planting device of claim 16, wherein the planting device further comprises a connecting bottom board, the connecting bottom board is arranged between the first bottom board and the second bottom board, one end of the connecting bottom board is buckled with the first bottom board through the buckle structures, another end of the connecting bottom board is buckled with the second bottom board through the buckle structures.

18. The planting device of claim 16, wherein each of the buckle structures comprises a first flange, a first hook, a second flange, and a second hook, the first hook and the second hook are respectively arranged at the two ends of a connecting bottom board, the first flange is arranged at an end of the first bottom board, and the first hook is configured to buckle the first flange, the second flange is arranged at the end of the second bottom board, the second hook is configured to buckle the second flange.

19. The planting device of claim 1, further comprising a base frame and a storage rack, wherein the base frame is arranged below the bottom board, the base frame is connected to the plurality of poles, the storage rack is arranged on the base frame and configured to accommodate items.

20. A planting device comprising:
at least one bottom board;
a plurality of baffles distributed on a circumference of the bottom board;
a plurality of connecting plates, each of the plurality of connecting plates connecting adjacent two baffles of the plurality of baffles;
a plurality of poles correspondingly connected to the plurality of connecting plates;
a support assembly, the support assembly comprising a plurality of support members, the plurality of support members distributed on a circumference of the bottom board, the bottom board arranged on the plurality of support members,
wherein each of the plurality of poles comprises an outer plate portion and an inner plate portion, the outer plate portion is connected to the corresponding connecting plate, the inner plate portion is configured to support the bottom board; a hollow space is formed between the outer plate portion and the inner plate portion, two sides of the outer plate portion are respectively connected to two sides of the inner plate portion to enclose the hollow space;
the inner plate portion comprises a first inner plate and a second inner plate, the first inner plate and the second inner plate intersect with each other, the first inner plate of the inner plate portion of a pole of the plurality of poles is arranged opposite to the second inner plate of the inner plate portion of an adjacent pole of the plurality of poles, two ends of each of the plurality of the support members are respectively connected to the first inner plate and the second inner plate arranged opposite to each other.

\* \* \* \* \*